(12) United States Patent
Zhang et al.

(10) Patent No.: US 12,129,193 B2
(45) Date of Patent: Oct. 29, 2024

(54) PROCESSING APPARATUS FOR TREATING ACID MINE WASTEWATER USING ACTIVATED CARBON-LOADED MICROORGANISM

(71) Applicant: Nanjing Institute of Environmental Sciences, MEE, Nanjing (CN)

(72) Inventors: Houhu Zhang, Nanjing (CN); Bing Ma, Nanjing (CN); Jinglong Liu, Nanjing (CN); Hao Zhou, Nanjing (CN); Xiaochen Lin, Nanjing (CN); Shenghu Zhang, Nanjing (CN); Guodong Kang, Nanjing (CN)

(73) Assignee: Nanjing Institute of Environmental Sciences, MEE, Nanjing (CN)

( * ) Notice: Subject to any disclaimer, the term of this patent is extended or adjusted under 35 U.S.C. 154(b) by 0 days.

(21) Appl. No.: 18/395,312

(22) Filed: Dec. 22, 2023

(65) Prior Publication Data
US 2024/0317620 A1    Sep. 26, 2024

(30) Foreign Application Priority Data

Mar. 24, 2023 (CN) .......................... 202310298132.6

(51) Int. Cl.
| | | |
|---|---|---|
| C02F 3/28 | (2023.01) | |
| C02F 3/00 | (2023.01) | |
| C02F 3/34 | (2023.01) | |
| C02F 103/10 | (2006.01) | |

(52) U.S. Cl.
CPC .............. *C02F 3/2826* (2013.01); *C02F 3/34* (2013.01); *C02F 2003/003* (2013.01); *C02F 2103/10* (2013.01); *C02F 2201/002* (2013.01)

(58) Field of Classification Search
CPC .. C02F 2103/10; C02F 2101/105; C02F 3/28; C02F 3/2826; C02F 3/34; C02F 2201/002
USPC ....................................................... 210/315
See application file for complete search history.

(56) References Cited

U.S. PATENT DOCUMENTS 6,325,923 B1    12/2001    Zaluski et al.

FOREIGN PATENT DOCUMENTS

| | | |
|---|---|---|
| CN | 104071945 A | 10/2014 |
| CN | 109879553 A | 6/2019 |
| CN | 110078209 A | 8/2019 |
| CN | 111362419 A | 7/2020 |
| CN | 214781245 U | 11/2021 |
| KR | 20050020441 A | 3/2005 |

*Primary Examiner* — Claire A Norris
(74) *Attorney, Agent, or Firm* — Westbridge IP LLC (57) ABSTRACT

A processing apparatus for treating acid mine wastewater using an activated carbon-loaded microorganism includes a purifying container, a reducing body and an oxygen consumption body. By arranging a fuel gas body, a bottom of a cover disc is in threaded connection with a top of a top pipe after red phosphorus in a bottom cylinder is ignited, air in a feeding chamber enters into the bottom cylinder through gas ports, the oxygen in the air is consumed as the red phosphorus continues to burn, such that an interior of a reaction bin is in an oxygen-free environment, for ease of the microorganism performing the biological reduction reaction on the acid mine wastewater.

6 Claims, 10 Drawing Sheets

PROCESSING APPARATUS FOR TREATING ACID MINE WASTEWATER USING ACTIVATED CARBON-LOADED MICROORGANISM

CROSS-REFERENCE TO RELATED APPLICATIONS

The application claims priority to Chinese Patent Application No. 202310298132.6, filed on Mar. 24, 2023, which is incorporated herein by reference in its entirety.

TECHNICAL FIELD

The present disclosure relates to the technical field of wastewater treatment, and in particular to a processing apparatus for treating acid mine wastewater using an activated carbon-loaded microorganism.

BACKGROUND

With the rapid development of global industrialization, the exploitation of mineral resources is further intensified, and acid mine wastewater therefrom has become one of main sources for water pollution in many countries. The acid mine wastewater refers to acid water generated in a manner that sulphide ore series such as a coal mine and a multi-metal sulfide ore are oxidized, decomposed, and in chemical combination with water to form sulfuric acid during exploitation, transportation, ore separation, mullock discharge, tailings storage and other production processes, and the acid mine wastewater presents a strong acidity due to a relatively high mass concentration of sulfate therein, with a pH value of being generally 4.5-6.5.

Without treatment, arbitrary discharge of the acid mine wastewater will cause a great area of acid pollution and heavy metal pollution, which can corrode pipelines, water pumps, steel rails and other mine devices as well as concrete structures, and is also hazardous to human health. In addition, the acid water will pollute water sources and endanger fishes and other aquatic organisms, which is unfavourable for the protection of the ecological environment, and therefore a processing apparatus for treating acid mine wastewater using an activated carbon-loaded microorganism is proposed.

SUMMARY

The objective of the present disclosure is to provide a processing apparatus for treating acid mine wastewater using an activated carbon-loaded microorganism, to solve the issue proposed in the background art.

To implement the foregoing objective, the objective of the present disclosure is to provide a processing apparatus for treating acid mine wastewater using an activated carbon-loaded microorganism, including a purifying container, a reducing body and an oxygen consumption body, where a reaction bin is arranged in the purifying container, the reaction bin includes a feeding chamber and a reaction chamber communicating with the feeding chamber, one end in the reaction chamber that is close to the feeding chamber is provided with a partition plate, an activity body is arranged in the partition plate, the reducing body includes a housing and an inner core arranged in the housing, the housing is located at one end in the reaction chamber that is away from the feeding chamber, a groove is formed in an upper surface of a bottom of the housing, the housing is provided with a drainage pipe at a position approaching to an outer side, the drainage pipe communicates with the groove, the inner core includes a plurality of honeycomb plates located in the housing, the honeycomb plates are activated carbon plate loaded with microorganisms, a top of the purifying container is provided with a port penetrating through an upper surface thereof, a bottom of the port communicates with the feeding chamber, the oxygen consumption body includes a top pipe of which a bottom communicates with a top of the port, and a top end in the top pipe is provided with a fuel gas body.

As a further improvement of the technical solution, a bottom of the partition plate is provided with a plate orifice, the activity body includes a baffle and a screw shaft that is in threaded connection with a top of the baffle, the baffle is located in the plate orifice and in plugging fit with the plate orifice, a top of the screw shaft passes through an upper surface of the purifying container, and the screw shaft is rotationally connected with an inner wall of the purifying container.

As a further improvement of the technical solution, the fuel gas body includes a cover disc and a bottom cylinder that is in threaded connection with a bottom of the cover disc, an outer wall at the bottom of the cover disc is in threaded connection with an inner wall of the top end of the top pipe, red phosphorus is filled in the bottom cylinder, and a side wall of the bottom cylinder that is close to the top end is provided with a plurality of gas ports.

As a further improvement of the technical solution, the cover disc is provided with a bottom port penetrating through upper and lower surfaces thereof, a bottom of the bottom port communicates with a top of the bottom cylinder, a shielding disc is arranged in the bottom port, a spring is arranged at a bottom of the shielding disc, the shielding disc is connected with an inner wall of the bottom port through the spring arranged at the bottom, and a top of the shielding disc is clamped with a top in the bottom port.

As a further improvement of the technical solution, a top of the reaction chamber is provided with a gas slot penetrating through the upper surface of the purifying container, the oxygen consumption body further includes a top plate and a filter plate that is arranged at an inner bottom of the top plate, the top plate is located in the gas slot and has a top communicating with a side pipe, and the other end of the side pipe communicates with the top pipe.

As a further improvement of the technical solution, a gas sealing body is arranged at a top of the feeding chamber and includes a cover plate, a bottom of the cover plate is in plugging fit with the top of the feeding chamber, and a bottom surface of the cover plate is provided with a sealing gasket.

As a further improvement of the technical solution, both ends of the purifying container are unequal in height, and the feeding chamber is higher than the reaction chamber.

As a further improvement of the technical solution, the honeycomb plates are connected through a middle shaft, one end of the middle shaft that is away from the feeding chamber passes through a side wall of the housing, a second motor is arranged on the side wall of the housing, and the second motor meshes with the middle shaft through a gear.

As a further improvement of the technical solution, one end of the drainage pipe that is away from the groove is provided with a first motor, and the first motor is in drive connection with a screw that is located in the groove.

As a further improvement of the technical solution, the gas sealing body further includes a gas nozzle, a middle of the cover plate is provided with a round port penetrating through upper and lower surfaces thereof, the gas nozzle is in threaded connection with a top end in the round port, a bottom of the gas nozzle is hollow, and a side wall of the bottom of the gas nozzle is provided with a filter port which communicates with the round port.

Compared with the prior art, the present disclosure has the following beneficial effects:

In the processing apparatus for treating the acid mine wastewater using the activated carbon-loaded microorganism, the honeycomb plates, that is, the activated carbon plates loaded with the microorganism, reduce sulfate in the acid mine wastewater to sulfide through a biological reduction reaction of dissimilartive sulfate of the microorganism, and the sulfide is combined with heavy metal ions in the wastewater to form metal sulfide for precipitation, thereby achieving the treatment of the acid mine wastewater.

In the processing apparatus for treating the acid mine wastewater using the activated carbon-loaded microorganism, by arranging the fuel gas body, the bottom of the cover disc is in threaded connection with the top of the top pipe after the red phosphorus in the bottom cylinder is ignited, air in the feeding chamber enters into the bottom cylinder through the gas ports, the oxygen in the air is consumed as the red phosphorus continues to burn, such that an interior of the reaction bin is in an oxygen-free environment, for ease of the microorganism performing the biological reduction reaction on the acid mine wastewater.

In the processing apparatus for treating the acid mine wastewater using the activated carbon-loaded microorganism, by arranging the top plate, an air volume at the fuel gas body is reduced due to the combustion of the red phosphorus in the fuel gas body, that is, a negative pressure is formed at the fuel gas body to drive the reaction gas generated by the reduction reaction of the microorganism in the reaction chamber, and the reaction gas flows to the fuel gas body from the side pipe after being filtered by the filter plate, such that the reaction gas is subjected to deoxidizing treatment; and the gas sealing body is provided, the bottom of the cover plate is inserted into the top end of the feeding chamber, such that the sealing gasket fills the gap between the cover plate and the feeding chamber, to prevent external air from entering into the purifying container from the feeding chamber, and to ensure the treatment effect of the microorganism on the acid mine wastewater.

DETAILED DESCRIPTION OF THE EMBODIMENTS

The technical solution in the embodiments of the present disclosure is clearly and completely elaborated below in combination with the drawings in the embodiments of the present disclosure. It is apparent that the described embodiments are only a part of the embodiments of the present disclosure but not all. Based on the embodiments of the present disclosure, all the other embodiments obtained by those of ordinary skill in the art on the premise of not contributing creative effort should belong to the protection scope of the present disclosure.

In the description of the present disclosure, it is understood that orientation or position relationships indicated by the terms "center", "longitudinal", "transverse", "length", "width", "thickness", "upper", "lower", "front", "rear", "left", "right", "vertical", "horizontal", "top", "bottom", "inner", "outer", "clockwise", "anticlockwise", and the like are based on the orientation or position relationships as shown in the drawings, for ease of describing the present disclosure and simplifying the description only, rather than indicating or implying that the mentioned device or element necessarily has a particular orientation and must be constructed and operated in the particular orientation. Therefore, these terms should not be understood as limitations to the present disclosure.

In addition, the terms "first" and "second" are merely used for description, instead of being understood as indicating or implying relative importance or impliedly indicating the quantity of the showed technical features. Thus, the features defined with "first" and "second" may expressly or impliedly one or more features. In the description of the present disclosure, "a plurality of" means two or above two, unless specific limitation otherwise.

Embodiment 1

Please refer to what is shown in FIG. 1-FIG. 10, the objective of this embodiment is to provide a processing apparatus for treating acid mine wastewater using an activated carbon-loaded microorganism, including a purifying container 1, a reducing body 2 and an oxygen consumption body 3, where a reaction bin 11 is arranged in the purifying container 1, the reaction bin 11 includes a feeding chamber and a reaction chamber communicating with the feeding chamber, a top of the feeding chamber penetrates through an upper surface of the purifying container 1, one end of the reaction chamber that is away from the feeding chamber penetrates through a side surface of the purifying container 1, one end in the reaction chamber that is close to the feeding chamber is provided with a partition plate, an activity body 12 is arranged in the partition plate and configured to control the flowing of the acid mine wastewater in the feeding chamber to the inside of the reaction chamber, the reducing body 2 includes a housing 21 and an inner core 22 arranged in the housing 21, the housing 21 is located at one end in the reaction chamber that is away from the feeding chamber, the housing 21 is fixed to the purifying container 1 through a bolt, a groove 211 is formed in an upper surface of a bottom of the housing 21, the housing 21 is provided with a drainage pipe 212 at a position approaching to an outer side, the drainage pipe 212 communicates with the groove 211, the inner core 22 includes a plurality of honeycomb plates 221 located in the housing 21, the honeycomb plates 221 are activated carbon plate loaded with microorganisms, and configured to reduce sulfate in the acid mine wastewater, generate and precipitate sulfide, to remove heavy metal ions in the acid mine wastewater, a top of the purifying container 1 is provided with a port 14 penetrating through an upper surface thereof, a bottom of the port 14 communicates with the feeding chamber, the oxygen consumption body 3 includes a top pipe 31 of which a bottom communicates with a top of the port 14, a top end in the top pipe 31 is provided with a fuel gas body 32, and the fuel gas body 32 is configured to consume oxygen, such that an interior of the activity body 12 is in an oxygen-free environment, for ease of a decomposition reaction of the microorganism to the acid mine wastewater.

During specific use of this embodiment, a bottom of a cover disc 321 is in threaded connection with atop of the top pipe 31 after the red phosphorus in a bottom cylinder 322 is ignited, the gas sealing body 13 is inserted into a top end of the feeding chamber after the acid mine wastewater is injected into the reaction bin 11 from the top end of the feeding chamber, since air in the feeding chamber enters into the bottom cylinder 322 through the gas ports 323, oxygen in the air is consumed as the red phosphorus continues to burn, such that the interior of the reaction bin 11 is in the oxygen-free environment. A screw shaft 122 in threaded connection with a baffle 121 is rotated at the top of the purifying container 1, such that the screw shaft 122 drives the baffle 121 to move to the top in a plate orifice and the acid mine wastewater in the feeding chamber can enter into the reaction chamber, and the acid mine wastewater is in contact with the honeycomb plates 221, in which microorganisms such as sulfate reducing bacteria and other anaerobic bacteria are loaded. The sulfate in the acid mine wastewater is reduced to sulfide through a biological reduction reaction of dissimilartive sulfate, and the sulfide is combined with heavy metal ions in the wastewater to form metal sulfide for precipitation, a screw 214 is driven to rotate in the groove 211 through a first motor 213, and under the action of a helical structure of the screw 214, liquid in the groove 211 drives precipitates depositing in the groove 211 to be discharged from the groove 211 through the drainage pipe 212, thereby completing the treatment of the acid mine wastewater.

Figure 3:
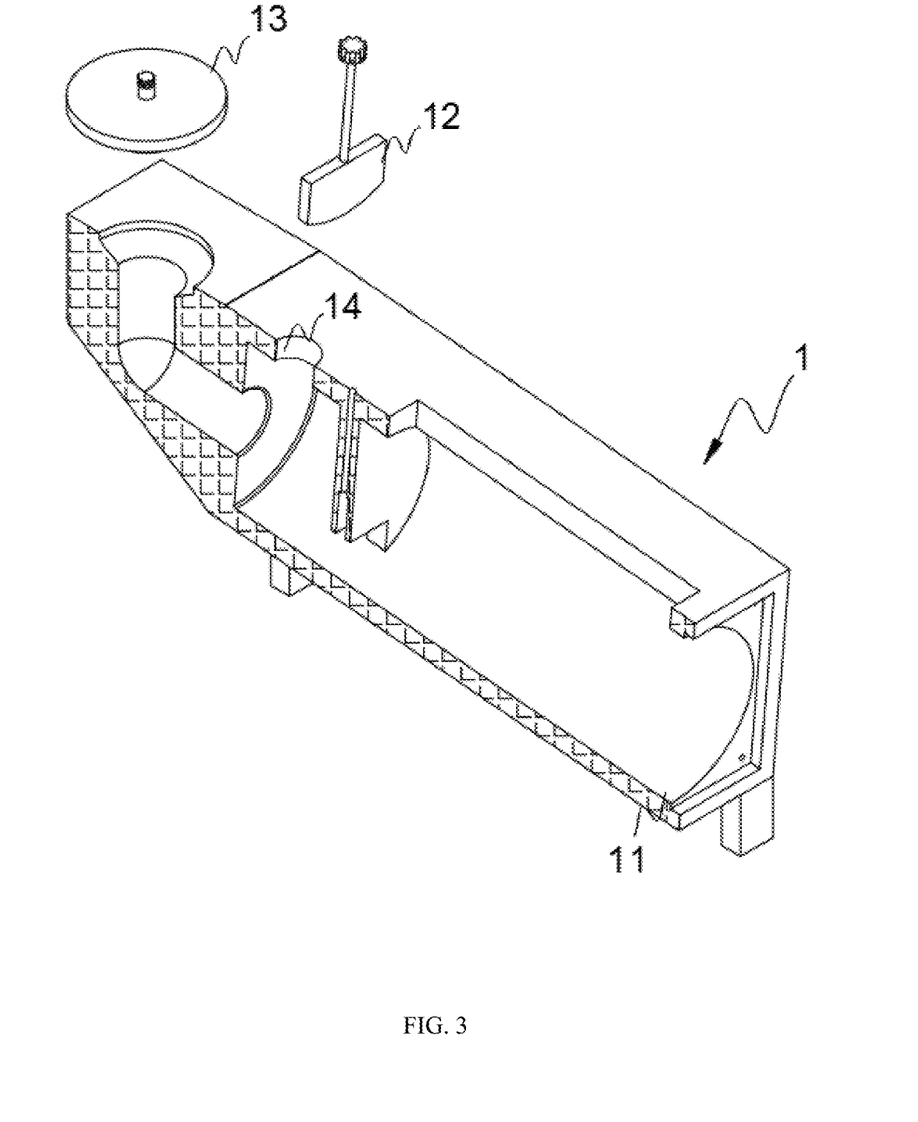
FIG. 3 is a section structure diagram of a purifying container of the present disclosure.
Figure 4:
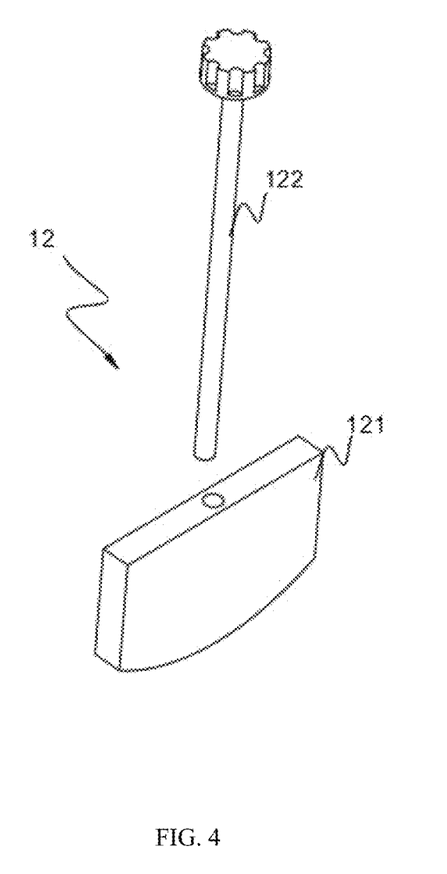
FIG. 4 is a structure schematic diagram of an activity body of the present disclosure.

In this embodiment, for ease of controlling the flowing of the acid mine wastewater to the inside of the reaction chamber, the bottom of the partition plate is provided with the plate orifice, the activity body 12 includes the baffle 121 and the screw shaft 122 that is in threaded connection with a top of the baffle 121, the baffle 121 is located in the plate orifice and in plugging fit with the plate orifice, a top of the screw shaft 122 passes through an upper surface of the purifying container 1, and the screw shaft 122 is rotationally connected with an inner wall of the purifying container 1. The screw shaft 122 in threaded connection with the baffle 121 is rotated at the top of the purifying container 1 in manners of plugging fit and threaded connection, such that the screw shaft 122 can drive the baffle 121 to move up and down in the plate orifice, when the baffle 121 is located at the bottom of the plate orifice, the acid mine wastewater in the feeding chamber is blocked by the wastewater and cannot flow into the reaction chamber, and when the baffle 121 is located at the top inside the plate orifice, the acid mine wastewater in the feeding chamber can enter into the reaction chamber.

Figure 9:
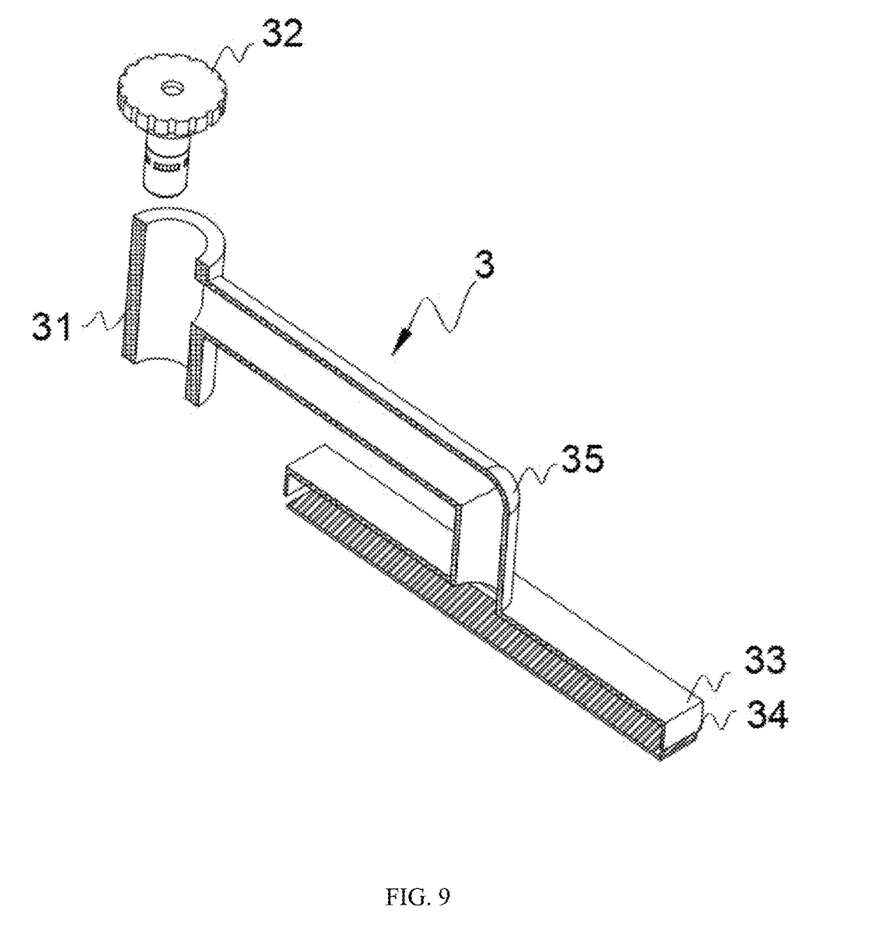
FIG. 9 is a section structure diagram of an oxygen consumption body of the present disclosure.
Figure 10:
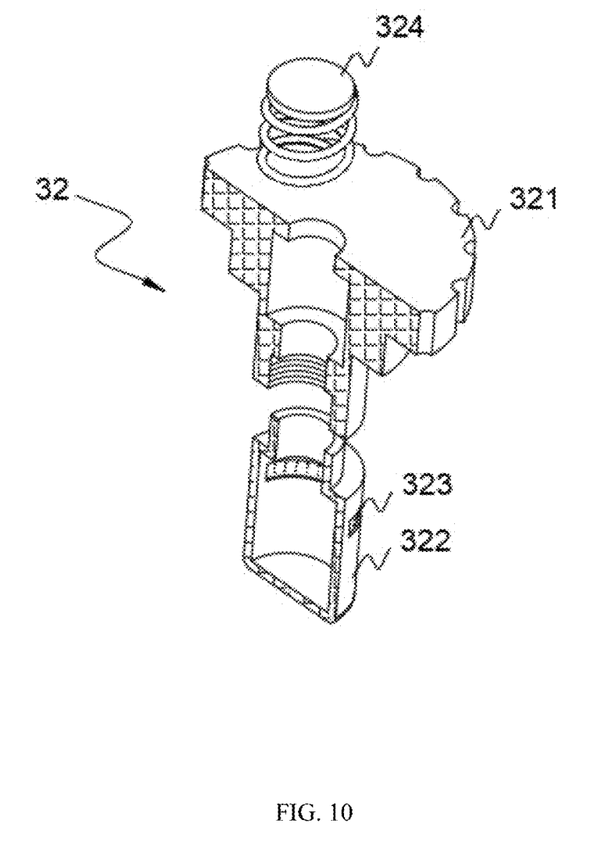
FIG. 10 is a section structure diagram of a fuel gas body of the present disclosure.

Considering that external air will be inevitably driven to enter when feeding the acid mine wastewater in the feeding chamber, for ease of the microorganism performing the biological reduction reaction on the wastewater in the oxygen-free environment, the fuel gas body 32 includes a cover disc 321 and a bottom cylinder 322 that is in threaded connection with a bottom of the cover disc 321, an outer wall at the bottom of the cover disc 321 is in threaded connection with an inner wall of the top end of the top pipe 31, the red phosphorus is filled in the bottom cylinder 322, and a side wall of the bottom cylinder 322 that is close to the top end is provided with a plurality of gas ports 323. By arranging the fuel gas body 32, the bottom of the cover disc 321 is in threaded connection with the top of the top pipe 31 after the red phosphorus in the bottom cylinder 322 is ignited, air in the feeding chamber enters into the bottom cylinder 322 through the gas ports 323, the oxygen in the air is consumed as the red phosphorus continues to burn, substances generated by a combustion reaction of the red phosphorus and the oxygen are kept in the bottom cylinder 322 and cannot fall into the reaction bin 11, such that the interior of the reaction bin 11 is in an oxygen-free environment, for ease of the microorganism performing the biological reduction reaction on the acid mine wastewater.

Since the solid substances generated by the combustion of the oxygen in the air of the reaction bin 11 and the red phosphorus results in the decrease of the volume of the gas in the reaction bin 11, to maintain an air pressure balance inside and outside the purifying container 1, the cover disc 321 is provided with a bottom port penetrating through upper and lower surfaces thereof, a bottom of the bottom port communicates with a top of the bottom cylinder 322, a shielding disc 324 is arranged in the bottom port, a spring is arranged at a bottom of the shielding disc 324, the shielding disc 324 is connected with an inner wall of the bottom port through the spring arranged at the bottom, and a top of the shielding disc 324 is clamped with a top in the bottom port. By arranging the bottom port and the shielding disc 324 connected with the spring, when the volume of the gas in the reaction bin 11 is reduced, the external air pushes the shielding disc 324 to move inside the bottom port under the action of atmospheric pressure, such that the external air enters into the reaction bin 11 through a gap between the shielding disc 324 and the top of the bottom port, to carry out gas replenishment and achieve the air pressure balance inside and outside.

Since the microorganism will generate gas when decomposing the acid mine wastewater, to perform a deoxidizing treatment on the gas, a top of the reaction chamber is provided with a gas slot penetrating through the upper surface of the purifying container 1, the oxygen consumption body 3 further includes a top plate 33 and a filter plate 34 that is arranged at an inner bottom of the top plate 33, the filter plate 34 is an activated carbon plate, the top plate 33 is located in the gas slot and has a top communicating with a side pipe 35, and the other end of the side pipe 35 communicates with the top pipe 31. Due to the combustion of the red phosphorus in the fuel gas body 32, the volume of the air at the fuel gas body 32 is reduced by arranging the top plate 33, that is, a negative pressure is formed at the fuel gas body 32, to drive the reaction gas generated by the reduction reaction of the microorganism in the reaction chamber, and the reaction gas flows to the fuel gas body 32 from the side pipe 35 after being filtered by the filter plate 34, thereby performing the deoxidizing treatment on the reaction gas.

Figure 5:
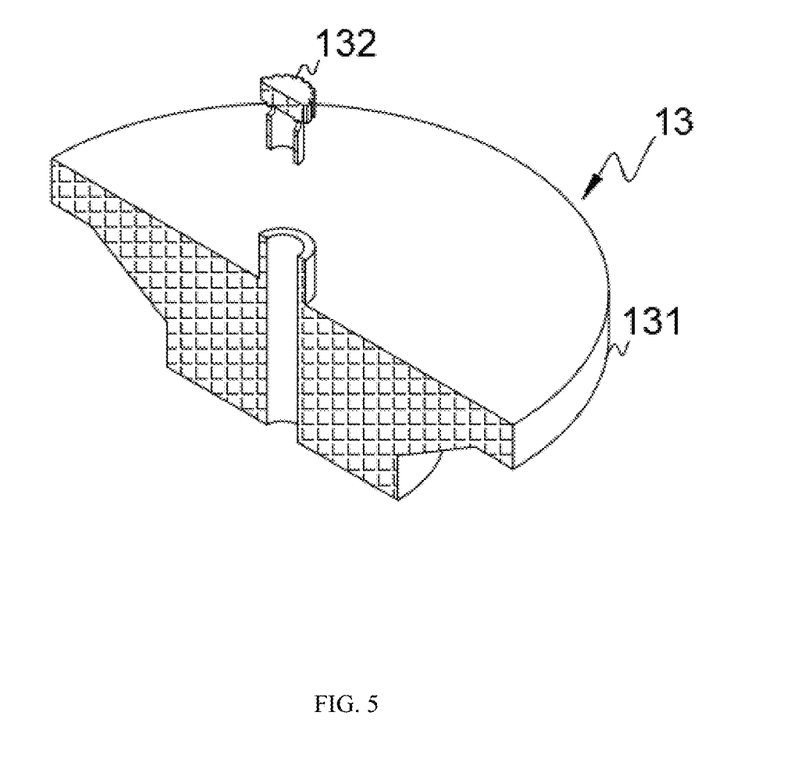
FIG. 5 is a section structure diagram of a gas sealing body of the present disclosure.

To prevent the entry of the external air from the feeding chamber to affect the treatment of the microorganism on the acid mine wastewater, a gas sealing body 13 is arranged at a top of the feeding chamber and includes a cover plate 131, a bottom of the cover plate 131 is in plugging fit with the top of the feeding chamber, and a bottom surface of the cover plate 131 is provided with a sealing gasket. The bottom of the cover plate 131 is inserted into the top end of the feeding chamber by arranging the gas sealing body 13, such that the sealing gasket can fill the gap between the cover plate 131 and the feeding chamber, to prevent the external air entering into the purifying container 1 from the feeding chamber, and to ensure the treatment effect of the microorganism on the acid mine wastewater.

Figure 1:
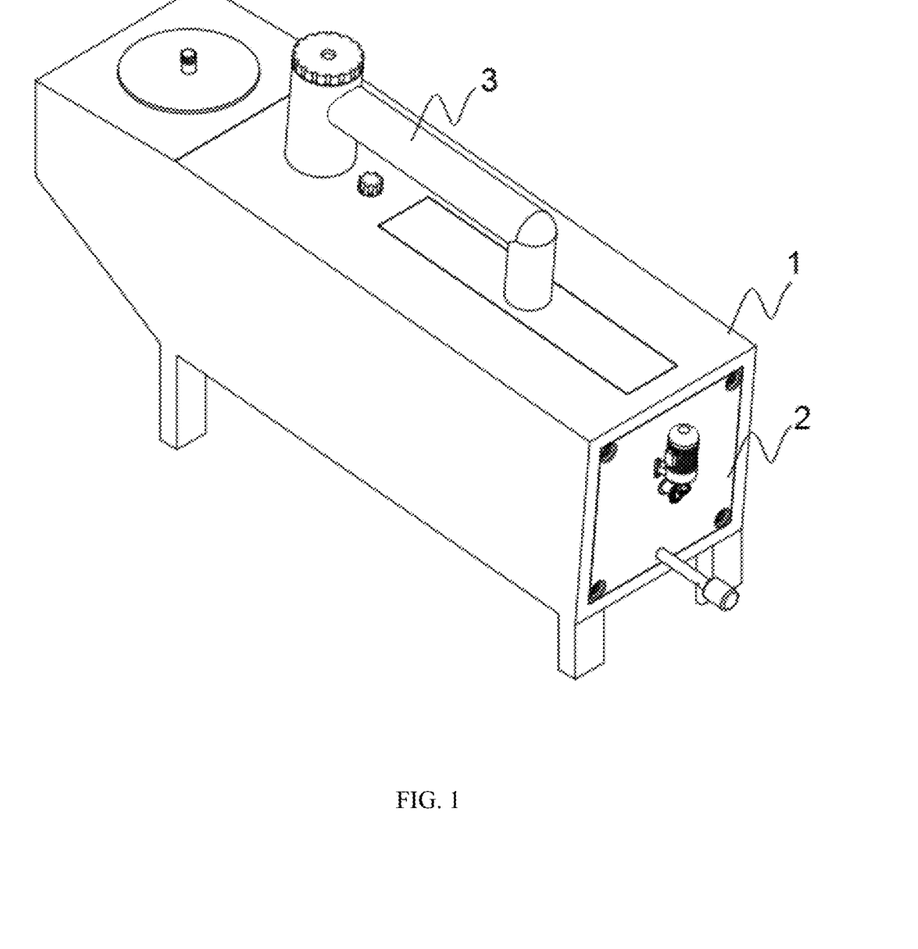
FIG. 1 is a schematic diagram of an overall structure of the present disclosure.
Figure 2:
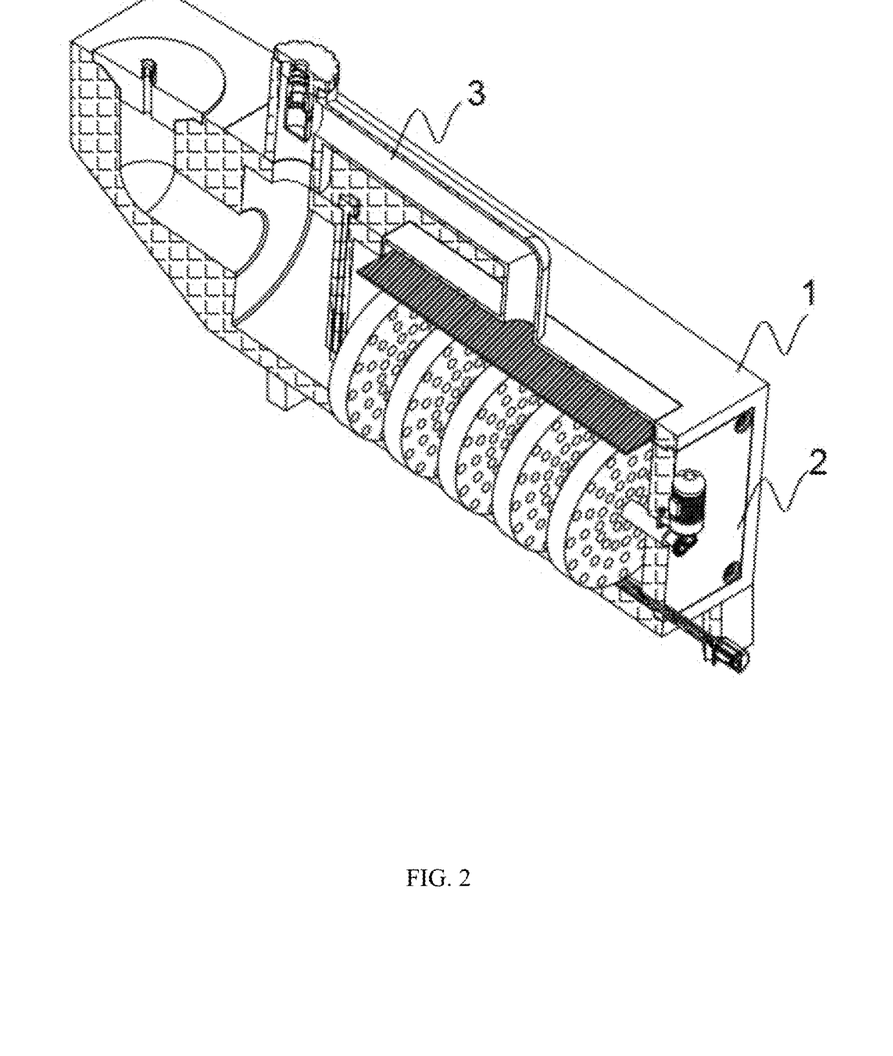
FIG. 2 is a structure diagram of an overall section of the present disclosure.

For ease of the acid mine wastewater flowing to the reaction chamber from the feeding chamber and passing through the honeycomb plates 221, both ends of the purifying container 1 are unequal in height, and the feeding chamber is higher than the reaction chamber. Due to a relatively high height, the feeding chamber can drive the acid mine wastewater to enter the reaction chamber from the feeding chamber under gravity, which is conducive to the treatment of the acid mine wastewater through the honeycomb plates 221.

Figure 6:
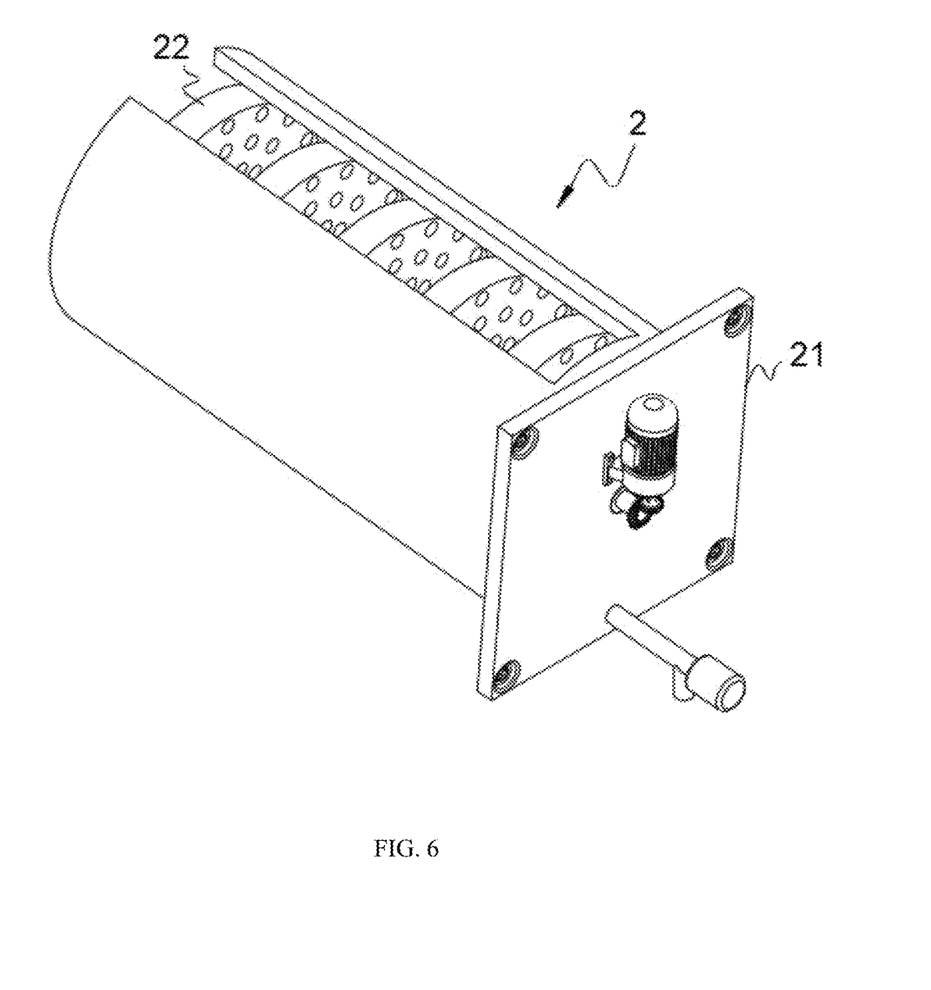
FIG. 6 is a structure schematic diagram of a reducing body of the present disclosure.
Figure 8:
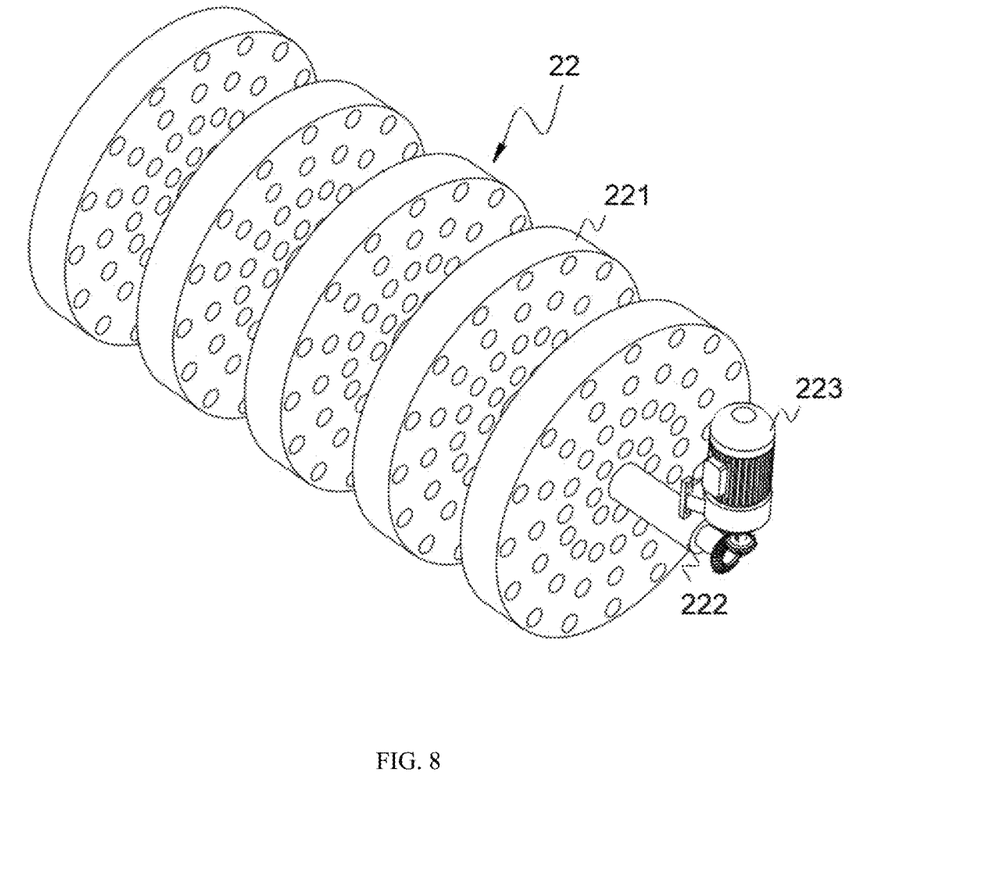
FIG. 8 is a structure schematic diagram of an inner core of the present disclosure.

To improve the treatment efficiency of the acid mine wastewater, the honeycomb plates 221 are connected through a middle shaft 222, one end of the middle shaft 222 that is away from the feeding chamber passes through a side wall of the housing 21, a second motor 223 is arranged on the side wall of the housing 21, and the second motor 223 meshes with the middle shaft 222 through a gear. The second motor 223 drives the middle shaft 222 and then drives the honeycomb plates 221 to rotate in the housing 21, such that the microorganisms everywhere in the honeycomb plates 221 can be in contact with the acid mine wastewater, thereby improving the treatment efficiency of the acid mine wastewater.

Figure 7:
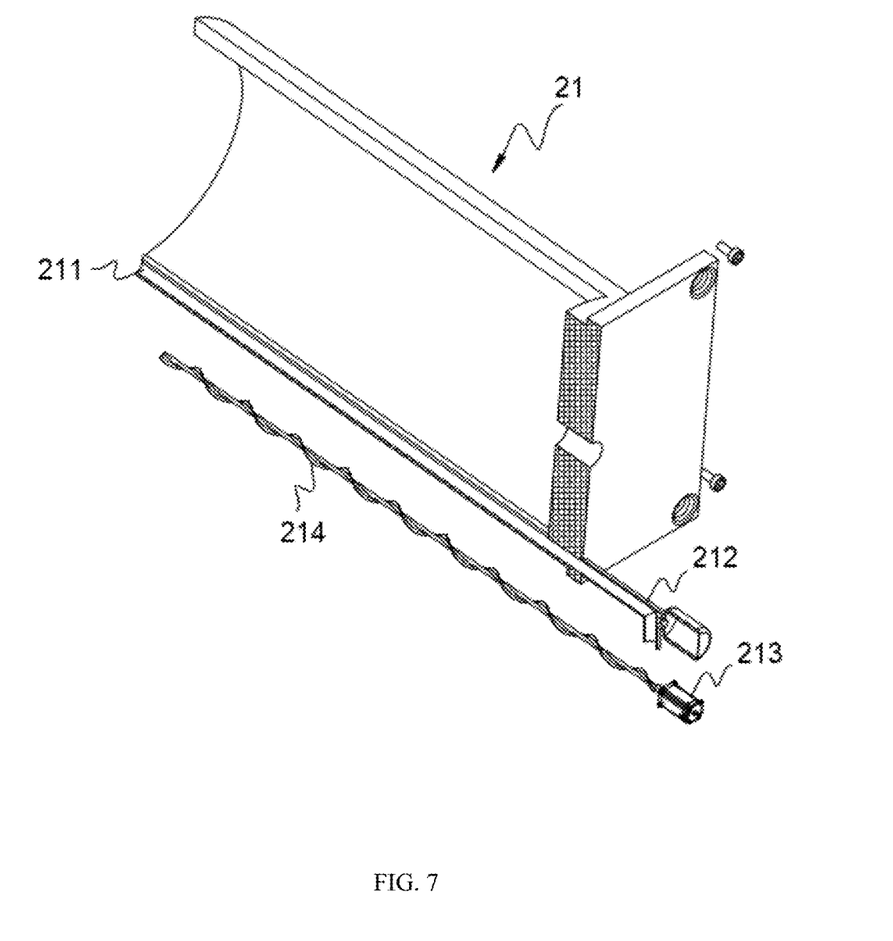
FIG. 7 is a section structure diagram of a housing of the present disclosure.

For ease of discharging the precipitates in the wastewater, one end of the drainage pipe 212 that is away from the groove 211 is provided with a first motor 213, and the first motor 213 is in drive connection with a screw 214 that is located in the groove 211. The screw 214 is driven to rotate in the groove 211 through the first motor 213, and under the action of a helical structure of the screw 214, liquid in the groove 211 drives precipitates depositing in the groove 211 to be discharged from the groove 211 through the drainage pipe 212.

Since the external gas cannot continue to flow into the reaction bin 11, a speed that the liquid in the reaction bin 11 flows out of the drainage pipe 212 is relatively slow and even the liquid cannot flow out, for ease of discharging the liquid, the gas sealing body 13 further includes a gas nozzle 132, a middle of the cover plate 131 is provided with a round port penetrating through upper and lower surfaces thereof, the gas nozzle 132 is in threaded connection with a top end in the round port, a bottom of the gas nozzle 132 is hollow, and a side wall of the bottom of the gas nozzle 132 is provided with a filter port which communicates with the round port. After the reducing treatment of the acid mine wastewater is completed, the gas nozzle 132 is rotated in the round port, such that the gas nozzle 132 moves up along the round port, to expose the filter port, and the external air enters into the reaction bin 11 through the filter port, for ease of discharging the liquid.

The basic principles, main characteristics and advantages of the present disclosure are shown and described above. Those skilled in the art shall understand that the present disclosure is not limited by the above embodiments, the above embodiments and specification describe the preferred embodiments of the present disclosure merely, are not intended to limit the present disclosure. Various changes and improvements will be made without deviating from the spirit and scope of the present the disclosure, and all of these fall within the scope of protection of the present disclosure. The scope of protection of the present disclosure is defined by the appended claims and their equivalents.

What is claimed is:

1. A processing apparatus for treating acid mine wastewater using an activated carbon-loaded microorganism, comprising a purifying container, a reducing body and an oxygen consumption body, wherein a reaction bin is arranged in the purifying container, the reaction bin comprises a feeding chamber and a reaction chamber communicating with the feeding chamber, one end in the reaction chamber that is close to the feeding chamber is provided with a partition plate, an activity body is arranged in the partition plate, the reducing body comprises a housing and an inner core arranged in the housing, the housing is located at one end in the reaction chamber that is away from the feeding chamber, a groove is formed in an upper surface of a bottom of the housing, the housing is provided with a drainage pipe at a position approaching to an outer side, the drainage pipe communicates with the groove, the inner core comprises a plurality of honeycomb plates located in the housing, the honeycomb plates are activated carbon plate loaded with microorganisms, a top of the purifying container is provided with a port penetrating through an upper surface thereof, a bottom of the port communicates with the feeding chamber, the oxygen consumption body comprises a top pipe of which a bottom communicates with a top of the port, and a top end in the top pipe is provided with a fuel gas body;

a bottom of the partition plate is provided with a plate orifice, the activity body comprises a baffle and a screw shaft that is in threaded connection with a top of the baffle, the baffle is located in the plate orifice, the baffle is in plugging fit with the plate orifice, a top of the screw shaft passes through an upper surface of the purifying container, and the screw shaft is rotationally connected with an inner wall of the purifying container;

the fuel gas body comprises a cover disc and a bottom cylinder that is in threaded connection with a bottom of the cover disc, an outer wall at the bottom of the cover disc is in threaded connection with an inner wall of the top end of the top pipe, red phosphorus is filled in the bottom cylinder, and a side wall of the bottom cylinder that is close to the top end is provided with a plurality of gas ports; and the honeycomb plates are connected through a middle shaft, one end of the middle shaft that is away from the feeding chamber passes through a side wall of the housing, a second motor is arranged on the side wall of the housing, and the second motor meshes with the middle shaft through a gear.

2. The processing apparatus for treating the acid mine wastewater using the activated carbon-loaded microorganism according to claim 1, wherein a top of the reaction chamber is provided with a gas slot penetrating through the upper surface of the purifying container, the oxygen consumption body further comprises a top plate and a filter plate that is arranged at an inner bottom of the top plate, the top plate is located in the gas slot and has a top communicating with a side pipe, and the other end of the side pipe communicates with the top pipe.

3. The processing apparatus for treating the acid mine wastewater using the activated carbon-loaded microorganism according to claim 1, wherein a gas sealing body is arranged at a top of the feeding chamber and comprises a cover plate, a bottom of the cover plate is in plugging fit with the top of the feeding chamber, and a bottom surface of the cover plate is provided with a sealing gasket.

4. The processing apparatus for treating the acid mine wastewater using the activated carbon-loaded microorganism according to claim 1, wherein both ends of the purifying container are unequal in height, and the feeding chamber is higher than the reaction chamber.

5. The processing apparatus for treating the acid mine wastewater using the activated carbon-loaded microorganism according to claim 1, wherein one end of the drainage pipe that is away from the groove is provided with a first motor, and the first motor is in drive connection with a screw that is located in the groove.

6. The processing apparatus for treating the acid mine wastewater using the activated carbon-loaded microorganism according to claim 3, wherein the gas sealing body further comprises a gas nozzle, a middle of the cover plate is provided with a round port penetrating through upper and lower surfaces thereof, the gas nozzle is in threaded connection with a top end in the round port, a bottom of the gas nozzle is hollow, and a side wall of the bottom of the gas nozzle is provided with a filter port which communicates with the round port.

* * * * *